United States Patent
Tozawa et al.

(10) Patent No.: US 11,995,105 B2
(45) Date of Patent: May 28, 2024

(54) MERGING TOTALLY ORDERED SETS

(71) Applicant: INTERNATIONAL BUSINESS MACHINES CORPORATION, Armonk, NY (US)

(72) Inventors: Akihiko Tozawa, Minato-ku (JP); Takahide Nogayama, Kawasaki (JP); Ai Yoshino, Kawasaki (JP); Yasuharu Katsuno, Hodogaya-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 17/568,924

(22) Filed: Jan. 5, 2022

(65) Prior Publication Data
US 2023/0214409 A1 Jul. 6, 2023

(51) Int. Cl.
*G06F 16/28* (2019.01)
*G06F 7/16* (2006.01)
*G06F 18/23* (2023.01)

(52) U.S. Cl.
CPC .......... *G06F 16/285* (2019.01); *G06F 7/16* (2013.01); *G06F 18/23* (2023.01)

(58) Field of Classification Search
CPC ...... G06F 16/285; G06F 16/35; G06F 16/355; G06F 18/22; G06F 18/23; G06F 7/16
See application file for complete search history.

(56) References Cited

U.S. PATENT DOCUMENTS

| | | | |
|---|---|---|---|
| 6,999,968 B1 | 2/2006 | Parkin | |
| 7,844,557 B2 * | 11/2010 | Acharya | G06F 16/285 706/45 |
| 9,043,582 B2 * | 5/2015 | Larin | G06F 9/30043 712/214 |
| 2003/0061213 A1 * | 3/2003 | Yu | G06N 20/00 |
| 2009/0293049 A1 | 11/2009 | Gorelkina | |
| 2011/0258617 A1 | 10/2011 | Park et al. | |
| 2014/0304267 A1 * | 10/2014 | Deng | G06F 16/93 707/737 |
| 2017/0109272 A1 * | 4/2017 | Km | G06F 11/3692 |

OTHER PUBLICATIONS

Ganter, Bernhard, et al. "Merging ordered sets", InInternational Conference on Formal Concept Analysis, Springer, Berlin, Heidelberg. May 2, 2011, pp. 183-203.

(Continued)

*Primary Examiner* — Robert W Beausoliel, Jr.
*Assistant Examiner* — Cheryl M Shechtman
(74) *Attorney, Agent, or Firm* — Tutunjian & Bitetto, P.C.; Robert Richard Aragona

(57) ABSTRACT

Methods and systems for software analysis include determining a similarity score for an ordered input set and at least one ordered cluster set that represents a distance between the ordered input set and the at least one ordered cluster set. It is determined that he ordered input is similar to a first cluster of the at least one ordered cluster set, based on the similarity score. The ordered input set is merged to the first cluster of the at least one cluster set to generate a merged set that preserves an ordering of the ordered input set and the first cluster. Software analysis is performed using the merged set.

16 Claims, 7 Drawing Sheets

(56) References Cited

OTHER PUBLICATIONS

Hwang, F. K., et al. "A simple algorithm for merging two disjoint linearly ordered sets", SIAM Journal on Computing. Mar. 1972, pp. 1-9.
Anonymous. "GNU Diffutils", GNU Project, Free Software Foundation, Inc. Oct. 27, 2021, pp. 1-2.
Kutz, Martin, et al. "Faster Algorithms for Computing Longest Common Increasing Subsequences", Journal of Discrete Algorithms, Elsevier. Apr. 1, 2011, pp. 1-12.
Kostakis, Orestis. "Classy: fast clustering streams of call-graphs", Data Min Knowl Disc, Springer. Jul. 10, 2014, pp. 1-32.

* cited by examiner

MERGING TOTALLY ORDERED SETS

BACKGROUND

The present invention generally relates to set analysis, and, more particularly, to the merging of totally ordered sets.

The execution of a computer program may involve an ordered set of operations, with each operation leading to a next operation. Threaded programs may have multiple distinct sets of ordered operations, for each of the respective program execution threads.

SUMMARY

A method for software analysis includes determining a similarity score for an ordered input set and at least one ordered cluster set that represents a distance between the ordered input set and the at least one ordered cluster set. It is determined that he ordered input is similar to a first cluster of the at least one ordered cluster set, based on the similarity score. The ordered input set is merged to the first cluster of the at least one cluster set to generate a merged set that preserves an ordering of the ordered input set and the first cluster. Software analysis is performed using the merged set.

A software analysis system includes a hardware processor and a memory that stores a computer program. When executed by the hardware processor, the software program causes the hardware processor to determine a similarity score for an ordered input set and at least one ordered cluster set that represents a distance between the ordered input set and the at least one ordered cluster set, to determine that the ordered input is similar to a first cluster of the at least one ordered cluster set, based on the similarity score, to merge the ordered input set to the first cluster of the at least one cluster set to generate a merged set that preserves an ordering of the ordered input set and the first cluster, and to perform software analysis using the merged set.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
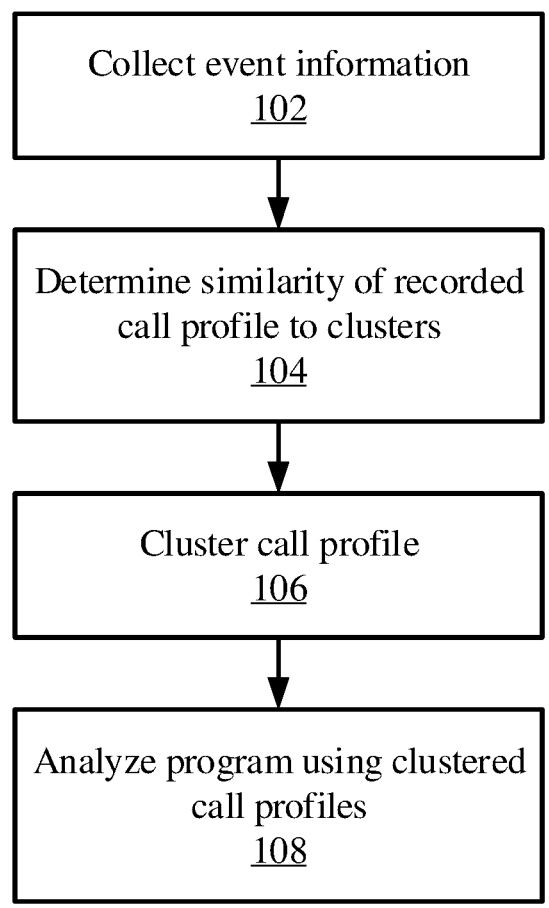
FIG. 1 is a block/flow diagram of a method for performing software analysis by clustering similar call profile information, in accordance with an embodiment of the present invention.

Merging ordered sets is challenging, particularly when all that is known is the order of a particular set, with no information about the metric that was used to determine that order. Although merging the elements of the sets is straightforward, there are multiple approaches for determining an order between elements from disparate sets when they are joined together.

One exemplary type of ordered set may include dynamic program execution profiles. Clustering such profiles together can help with software analysis, such as by refactoring an original program execution into distributed executions. This provides a view of how an application may be refactored for distributed environments. The execution profiles may further be used to reduce the heap size that a profiler occupies by running the merging online. Exemplary call graphs may have tens of thousands of nodes.

Another type of ordered set may include, for example, sections of a document. In a contract, the different sections of the agreement may represent different elements of a set, where an order between the sections may be relevant to the legal effectiveness of the document. Merging the sets may help to automate merging such contracts, preserving the correct order between sections without introducing confusion or redundancy.

Thread-wise call graphs for program execution may have a high similarity between threads that execute the same or similar workloads Similar threads may therefore be grouped together in a same cluster, while dissimilar threads may be classified into different clusters. A variety of similarity metrics may be used, as will be addressed in detail below.

Thread-wise call graphs in the same cluster may have shapes that are similar to one another, but they may also differ in details, as their execution paths may depend on dynamic parameters during execution. By merging these similar call graphs into a same cluster, a view of the execution of the application can be generated.

A similarity metric, for example to determine the similarity between program execution call graphs, may be used to perform clustering. Thread-wise call profiles may be merged, so as to preserve the order of function calls. A view may be created that reflects the program execution order. The similarity measure considers information as to how well call orders are preserved after merging the call graphs. Due to the potentially large size of the call graphs, computation efficiency for these processes may be a priority.

As used herein, the term "call graph" may refer to a graph structure that represents method calls that occur during the execution of a computer program. A call sequence or a trace refers to totally ordered sets that may be extracted from call graphs, neglecting the graph structure and identifying the order of method call events. As used herein, the term "call profile" refers to a call graph from a smaller unit of execution from a program, such as the execution of a single server request, which may complete within a single thread. As used herein, the term "application view" refers to the result of a clustering process that is applied to a set of thread-wise call profiles. Assuming a large number of call profiles are being considered, the application can provide a focus on a smaller number of clusters.

The sets that result from the merging described herein maintain the original order of the constituent sets as much as possible, with a similarity measure being defined according to how well input total orders are preserved after the merge. To improve the speed of the merging process, the input data may be represented as sets, rather than as strings.

An ordered set may be defined as (L, $\prec$), with L representing a set of elements and $\prec$ representing an ordering relation. Every element of L may have a valid ordering with respect to each other element of L, such that for all elements a, b∈L, either a$\prec$ b or b$\prec$ a. Notably, the ordering relation may apply specifically to the elements in S and may therefore be distinguished from other orderings as $\prec_L$. Thus, two distinct ordered sets L and E may have their own respective orderings $\prec_L$ and $\prec_R$.

In a first example, a first ordered set L may be expressed as a series of elements: 0a1b2c3, while a second ordered set R may be expressed as a series of elements: 0x1y2z3. The first ordering $\prec_L$ would therefore define an ordering between the elements of L, and the second ordering $\prec_R$ would define an ordering between the elements of R, but there may be ambiguity when these two sets are combined. For example, for elements x, y∈L and x, z∈R, with x $\prec_L$ y and x $\prec_R$ z, the ordering between y and z in a set that merges L and R cannot be determined.

A naïve approach to merging the two sets may simply identify the unique elements of R and append them to L: 0a1b2cxyz. While this merger executes quickly (e.g., in O(n) time) and does successfully combine the elements of the two sets, it does not preserve the ordering. This is readily apparent from the fact that the ordering of the merged set does not follow the ordering $\prec_R$ for elements x, y, and z.

Another approach to merging the two sets may attempt to generate a merged set that has the smallest edit distance from the two inputs. This may generate a merged set as 0ax1by2cz3, which does preserve the ordering of both input sets, but may take a long time to execute over large numbers of elements (e.g., executing in O(n²) time).

Rather than sacrificing the ordering information or facing long times for execution, the sets may be merged in such a manner as to preserve the total ordering of both sets as much as possible, while keeping execution time to O(n) or O(n log n). The following conditions may be met to preserve the ordering information. With input sets (L, $\prec_L$) and (R, $\prec_R$) and a merged output being expressed as (L∪R, $\prec_{L∪R}$):

1. The merge result preserves original orders, such that a $\prec_L$ b or a $\prec_R$ b implies a$\prec_{L∪R}$ b if, for any common elements of L and R, they have the same order with respect to $\prec_L$ and $\prec_R$.

2. Otherwise, the order is preserved for a and b, such that neither a nor b belongs to L∪R or a and b belong to the longest sub-sequence of L∩R that satisfies both $\prec_L$ and $\prec_R$.

A merge either may satisfy only the first condition, or may satisfy both conditions. By comparing the merge output (L∪R, $\prec_{L∪R}$) to (L, $\prec_L$) and (R, $\prec_R$), a similarity may be determined regardless of how the merge was performed. The similarity may coincide with the similarity from an edit distance, if an edit script is defined.

Using the input ordered sets, an index data structure can be implemented that can query positional information of set elements. The index may be created in O(n) time, and may be queried in O(1) time. A guided topological sort may then be used on the index, which may execute in O(n) time. The merge can then be reduced to integer sequence problems.

Referring now to FIG. 1, a method of performing analysis on a computer program is shown. Block 102 collects event information from one or more threads of a computer program, for example recording ordered system call information for respective threads. The collected event information may be divided into call profiles that represent the execution of a particular sub-process of the computer program.

Each call profile may be matched to a set of existing clusters using a similarity metric in block 104. The similarity metric provides a similarity score that can be used to identify a most similar cluster, and which may further be compared to a threshold value. Block 106 then clusters the call profile 106, using the similarity scores for the existing clusters. The similarity metric and clustering will be described in greater detail below.

Once the call profile(s) have been clustered, block 108 analyzes the computer program using the clustered call profiles. For example, an exemplary number of raw call profiles may be between 1,000 and 1,000,000. In contrast, the clusters of call profiles may have an exemplary size of between 10 and 100 call profiles. The clustered data is easier to analyze algorithmically due to the smaller size of these clusters. Automated call profile analysis can use complex analysis processes that would otherwise be intractable with larger sets of raw call profiles, such as in the extraction of input/output interactions of an application with other resources, which may include database, networks, user interfaces, etc. Automated analysis may classify these input/output interactions to adapt application behavior. For example, when a particular type of input/output operation is performed frequently, then that operation may be automatically optimized, such as by increasing an amount of available bandwidth or dedicating more system resources to the application. Although the present principles are described with particular focus on the analysis of a computer program, it should be understood that the similarity metric and merging for ordered sets can be used for any appropriate purpose.

As to the determination of a similarity between a call profile and a cluster in block 104 is shown, the total order after the merge is identified herein as M. A distance d between the a first ordered set L and a second ordered set R may be determined as:

$$d=2|L\cup R|-(|lcs(L,M)|+|lcs(R,M)|)$$

where lcs(·) is a longest common subsequence between the respective sets L and R.

In some cases, the distance d may coincide with a minimum edit distance. Any element which is not in the lcs of L and R, but which is in L∩R, only belongs to the lcs of one of lcs (L, M) or lcs(R, M). Thus:

$$|lcs(L,M)|+|lcs(R,M)|=|L|+|R|-\\(|L\cap R|-lcs(L,R))=|L\cup R|+|lcs(L,R)|$$

where |·| refers to the number of elements of a set. As a result:

$$d=2|L\cup R|-(|L\cup R|+|lcs(L,R)|)$$

$$d=|L\cup R|-|lcs(L,R)|$$

Similarity may be defined from this value d as in the case of edit distance. For example, the similarity score may be determined as $$\frac{|L|+|R|-d}{|L|+|R|}.$$

The similarity score may be used to determine how to handle an input set. For example, if the similarity score for an existing cluster is above a similarity threshold, then the input set may be added to the existing cluster using any appropriate merging technique, such as those described below. If there is no above-threshold similarity score between the input set and any existing cluster, then the input set may be used to define a new cluster.

Figure 2:
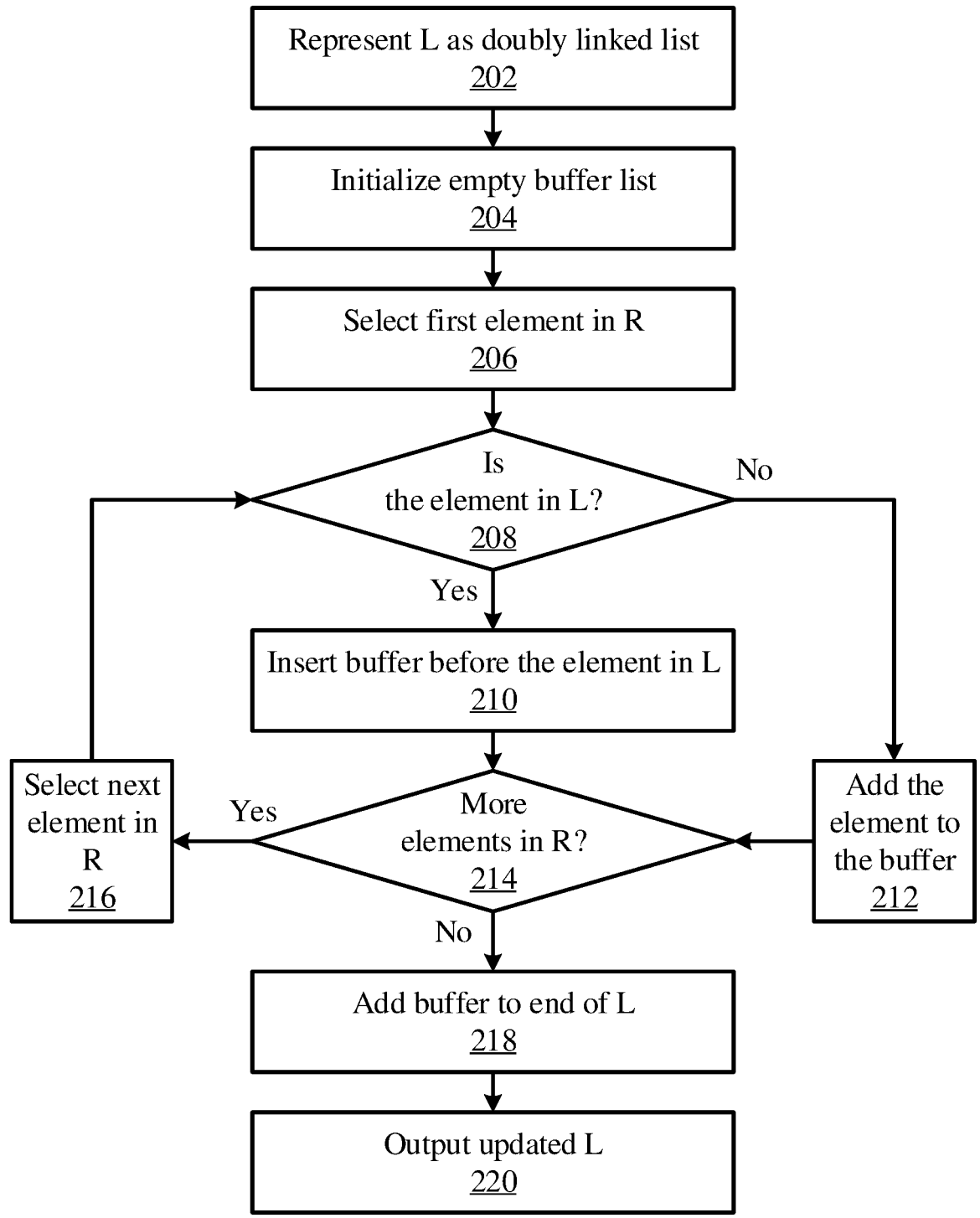
FIG. 2 is a block/flow diagram of a method for merging two ordered input sets using a doubly linked list, in accordance with an embodiment of the present invention.

Referring now to FIG. 2, an exemplary clustering approach that can be used in block 106 is shown. This merge can be performed in O(N) time and satisfies condition (1), as described above. For two ordered input sets of non-duplicated objects, L and R, a merged ordered set is output. In one example, the set L may be the totally ordered set of an existing cluster, which may or may not have previously merged other sets together, and the set R may be an input set. Block 202 represents the cluster set L as a doubly linked list, and a map m may be prepared that maps from set elements to cells in the doubly linked list.

Block 204 initializes an empty buffer list, which will be used to store elements which are present only in the input list R. Block 206 then selects a first element in the input list R. Block 208 checks whether the selected element is also in L, for example by referencing the map m. If so, then block 210 creates a new cell for the selected element and inserts it into the doubly linked list of L. If not, block 212 creates the new cell, but adds it to the buffer list instead.

Block 214 then determines whether there are more elements in R. If so, block 216 selects a next element from the input list R and processing returns to block 208. The process continues in this fashion until no elements remain in R. If the buffer list includes at least one element, then the elements of the buffer list are added to the end of the list representing L. Block 220 then outputs the updated list L, which represents the new cluster as an ordered, merged set.

Figure 3:
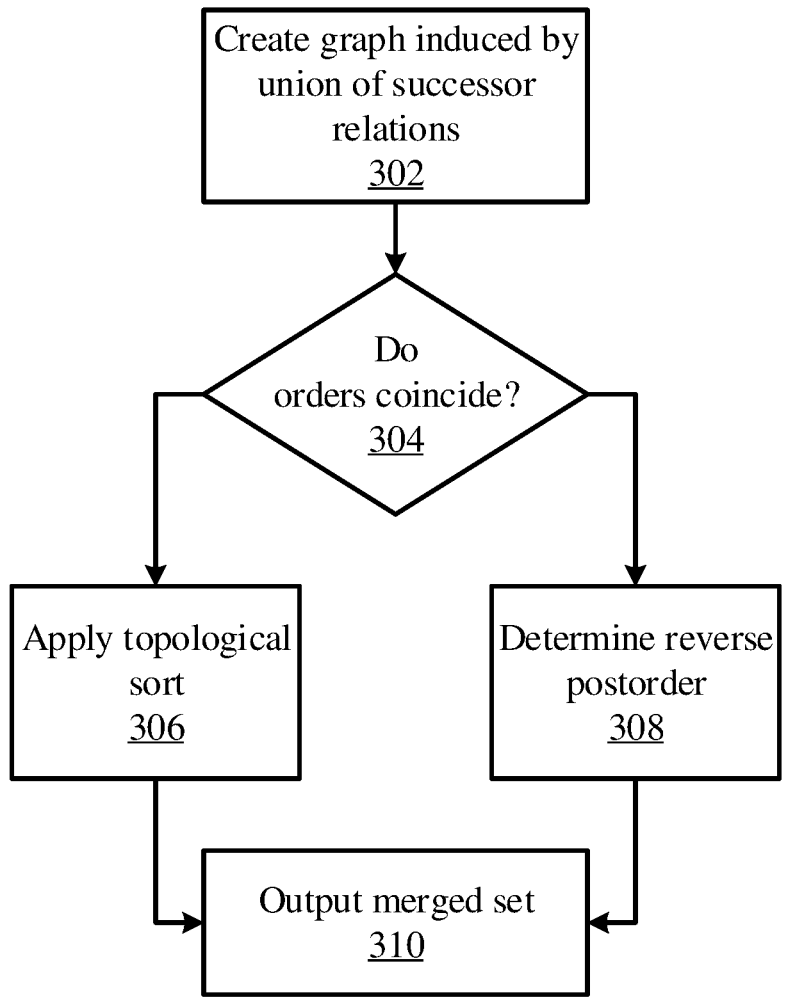
FIG. 3 is a block/flow diagram of a method for merging two ordered input sets using a topological sort, in accordance with an embodiment of the present invention.

Referring now to FIG. 3, an exemplary clustering approach that can be used in block 106 is shown. This merge can be performed in O(N) time and satisfies condition (1) as described above. Given inputs (L, $\prec_L$) and (R, $\prec_R$), block 302 creates a graph that is induced by the union of successor relations $\prec_L$ and $\prec_R$ of the given total orders $\prec_L$ and $\prec_R$. Block 304 determines whether orders among the intersection of L and R coincide.

If block 304 returns an affirmative, then block 306 calculates a total order on L∪R by applying a topological sort on the graph. If the orders do not coincide, then block 308 determines a reverse postorder of the graph to obtain an order that is equivalent to the topological sort over the cyclic graph. Block 310 outputs the merged set.

Figure 4:
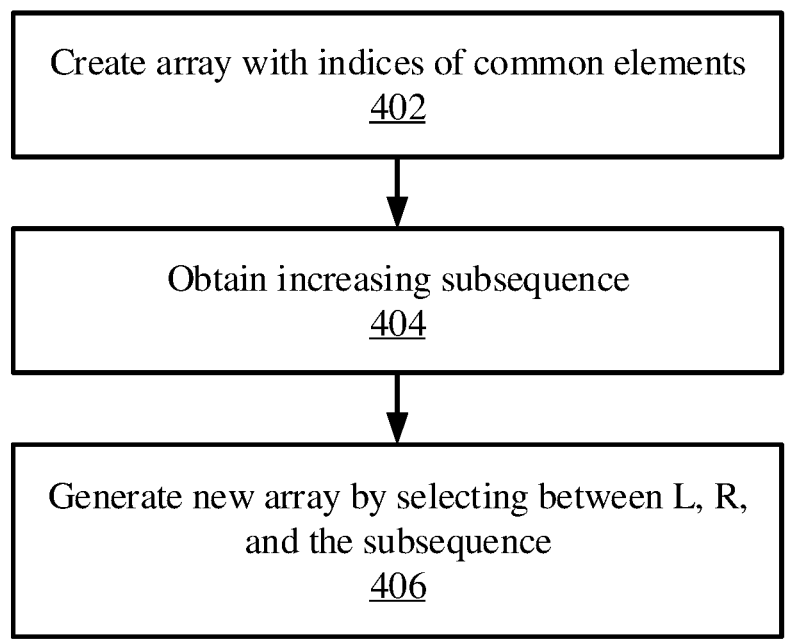
FIG. 4 is a block/flow diagram of a method for generating an edit script to merge two ordered input sets, in accordance with an embodiment of the present invention.

Referring now to FIG. 4, an exemplary clustering approach that can be used in block 106 is shown. This merge can be performed in O(N log N) time and satisfies both conditions (1) and (2) as described above. Given inputs L and R that are represented as arrays of non-duplicating objects that are sorted in their respective orders, an edit script is provided for merging L and R.

Block 402 generates a new array X that includes all indices of R that correspond to objects common with L, sorted by Ls order. Thus, X may have a length defined by the length of L∩R. For example, this may be performed using the following pseudo code:

```
i := 0;
X := array of integers with length len(L ∩ R)
For each value v in L[0], ... , L[len(L) − 1]
    If v occurs in R as the k[th] element
        X[i + +] = k
```

Block 404 then identifies a longest increasing subsequence of X, defined as the array S, which has a length K. This may be performed, for example, using Knuth's longest increasing subsequence algorithm. Block 406 uses an edit script to select elements between L, R, and S, to generate a new sorted array that includes the elements of both L and R.

An edit script can be generated using the following pseudo code:

```
k := 0, j := 0;
For each value v in L
    if k ≥ K or if v is not in R[S[k]]:
        Output 'X'
    else
        while j < S[k]: output 'R', j++;
        output 'S';
        k++, j++;
while j < len(R): output 'R', j++;
```

An edit script may be represented a string that includes parts labeled of 'S', 'L' and 'R', and describes two input strings, L and R, may be merged. Cursors may be used on these input strings, initially on their leftmost characters. During operation, edit scripts and the two inputs strings may be read from left to right. In a first condition, upon reading 'S' from the edit script, next characters in input strings L and R at their cursors may be the same, so this character may be emitted, and both cursors may be moved one character to the right. In a second condition, upon reading 'L', the character at Ls cursor is emitted, and only Ls cursor is moved. In a third condition, upon reading 'R', the character at R's cursor is emitted and only R's cursor is moved. Repeating these steps builds the merge result after consuming all characters in edit script and inputs.

Figure 5:
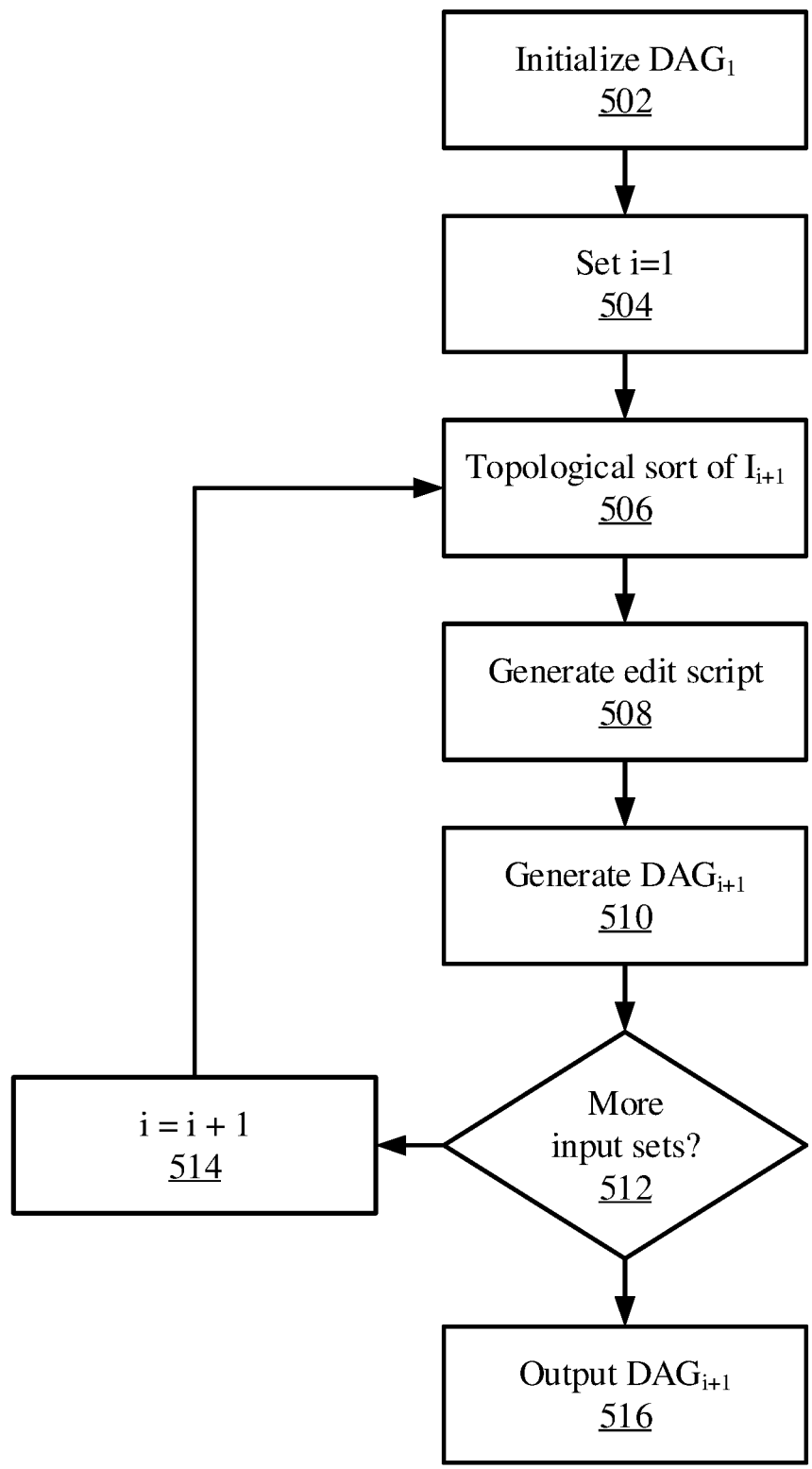
FIG. 5 is a block/flow diagram of a method for merging two ordered input sets using an edit script and a guided topological sort, in accordance with an embodiment of the present invention.

Referring now to FIG. 5, an exemplary clustering approach that can be used in block 106 is shown. This merge can be performed in O(k N log N) time and satisfies both conditions (1) and (2) as described above, for k inputs. This approach includes elements of the merges of FIGS. 3 and 4. An initial directed acyclic graph $DAG_1$ may be defined from a successor relation of the first input, $\prec_L$. Subsequent graphs $DAG_{i+1}$ may be defined based on a previous graph $DAG_i$.

Block 502 may initialize $DAG_1$ with elements that combine all of the inputs I and a total order of a first input $I_1$. A set of input total orders may be provided, $I_1, \ldots, I_k$. The nodes of $DAG_1$ may be expressed as $N_{DAG}$, with a total order ($N_{SUB}$, $\prec_{N_{SUB}}$) being defined over a subset $N_{SUB}$ of the nodes $N_{DAG}$. The edges of $DAG_1$ may be drawn between two elements with which an order is determined. Thus, each directed edge defines an order between the two elements it connects. The graph may be iteratively updated in a guided topological sort, as described below, to generate a final directed acyclic graph having a total order between its elements. Block 504 initializes a counter value to 1, representing an input number.

Block 506 performs a guided topological sort of a next input set $I_{i+1}$. Starting with a set $N=N_{DAG}$, block 506 picks a node n in N such that all predecessors of n are not in N, and such that either $N \notin N_{SUB}$ or n is the minimum candidate among all those nodes with no predecessors in N, according to $\prec_{N_{SUB}}$. Block 506 emits n as the next element of an output total order and removes n from N. This process is repeated until no elements remain in N, and a new combined total order is output as L. Thus, L is the previous graph $DAG_i$, sorted with a new total order that includes $I_{i+1}$. While any appropriate topological sort may be used, the guided topological sort described herein incorporates the input total order and condition (2), as described above, when choosing the node n, which provides a total order that satisfies the conditions described above.

Block 508 generates an edit script using L and the input total order $I_{i+1}$, for example using the process described above with respect to FIG. 4. Block 510 merges the total order into the graph to generate a new graph $DAG_{i+1}$, using the previous graph $DAG_i$, the input total order $I_{i+1}$, and the edit script. For example, a node n may be memorized (with no n being memorized for the initial state) and a total order and edit script may be read left-to-right.

Upon reading 'S,' an edge from node n to node m may be added, where m corresponds to a next element of the input total order $I_{i+1}$. No edge is added when no n has been memorized. Reading 'S' may always guarantee that the graph node m that corresponds to the next element of the input. Unlike in the 'S' case, upon reading "R," there are two possibilities: that m already exists and that m does not already exist. Thus, upon reading 'R,' no action is performed if there is already a node m corresponding to the next element of the input total order $I_{i+1}$ otherwise the same step is taken as in the 'S' case, after adding a node m. Occurrences of 'L' may be skipped.

Block 512 determines whether there are more input total orders I to consider. If so, block 514 increments i and processing returns to block 506 to add the next input total order. If there are no more total orders to add, block 516 outputs $DAG_{i+1}$ as a merged set with a merged total order.

Figure 6:
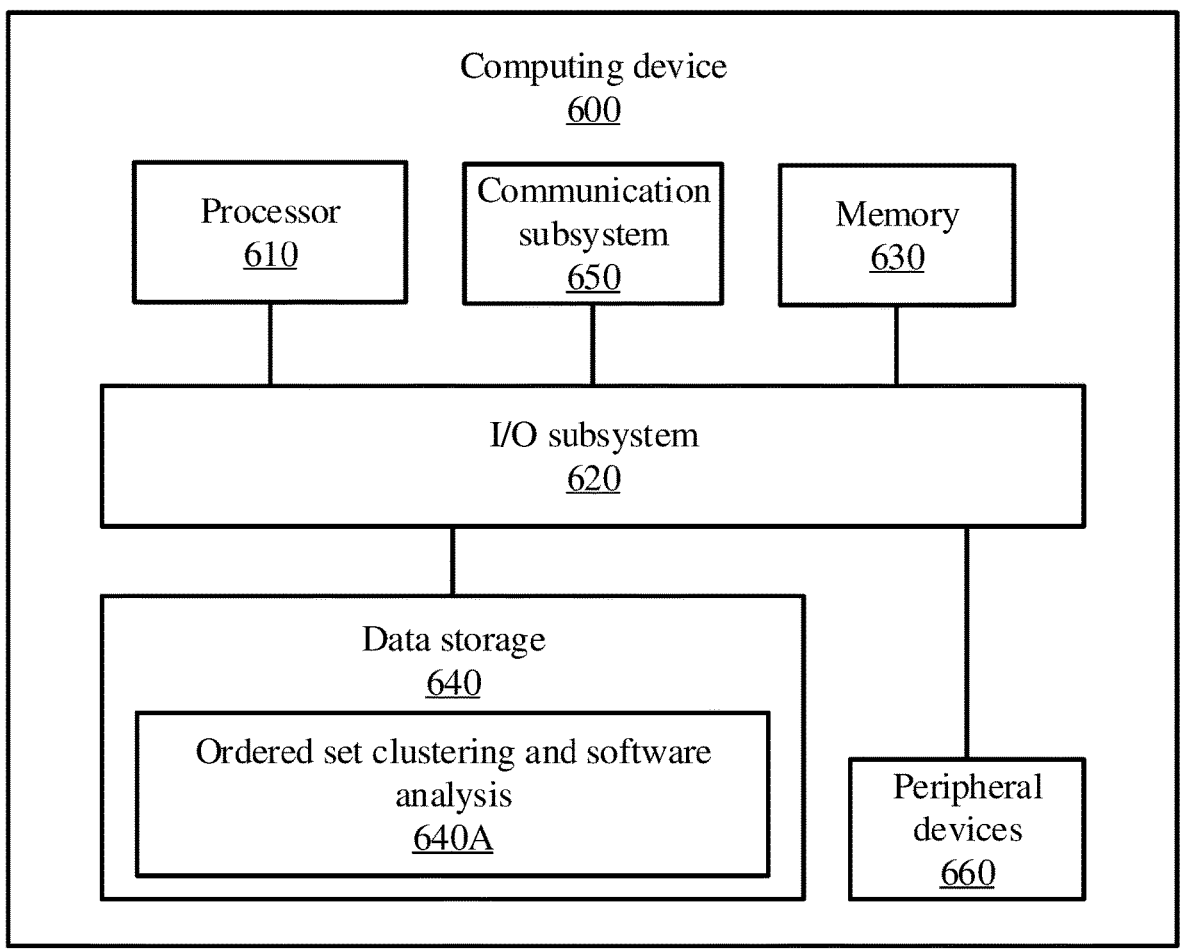
FIG. 6 is a block diagram of a computing system that includes a computer program to perform software analysis, in accordance with an embodiment of the present invention.

Referring now to FIG. 6, a block diagram shows an exemplary computing device 600, in accordance with an embodiment of the present invention. The computing device 600 is configured to perform clustering of ordered sets and software analysis.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as a one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for ordered set clustering and software analysis. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 7:
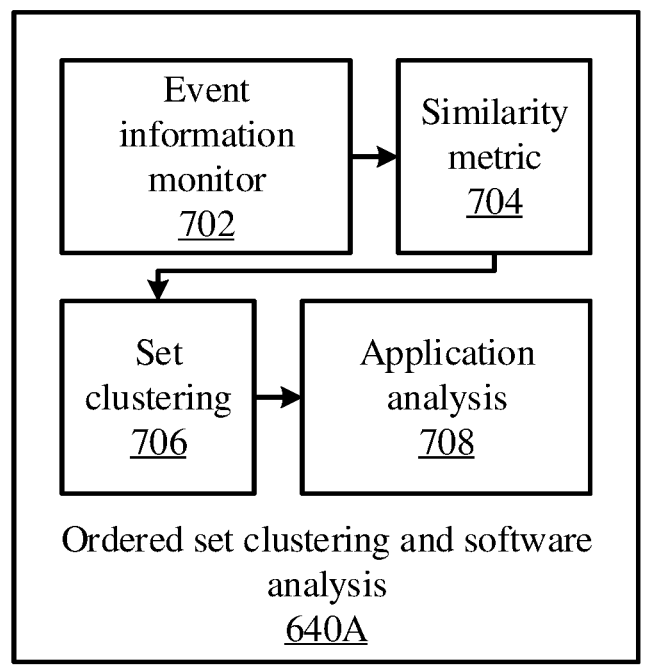
FIG. 7 is a block diagram of a computer program to perform software analysis, in accordance with an embodiment of the present invention.

Referring now to FIG. 7, additional detail on the ordered set clustering and software analysis 640A is shown. Event information monitor 702 collects information from a system, for example using event or system call logging on a computer system, to collect ordered sets of events. These ordered sets may be associated with call profiles of particular tasks or threads and may include an ordered collection of system calls performed by the task or thread.

A similarity metric 704 is used to identify call profiles that are similar to one another, and may include any appropriate metric for determining a distance between two ordered sets. Based on this similarity, ordered sets may be clustered together using any appropriate clustering method, such as those described herein. The set clustering 706 outputs clusters that each represent one or more combined ordered sets, each cluster having an ordering that preserves the orderings of the constituent sets. As noted above, set clustering 706 may be performed with a high degree of computational efficiency. Block 708 performs application analysis using the clusters.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for software analysis, comprising:

determining a similarity score for an ordered input set and at least one ordered cluster set that represents a distance between the ordered input set and the at least one ordered cluster set;

determining that the ordered input set is similar to a first cluster of the at least one ordered cluster set, based on the similarity score;

merging the ordered input set to the first cluster of the at least one cluster set to generate a merged set that preserves an ordering of the ordered input set and the first cluster by generating an edit script to merge the ordered input set and the first cluster and iteratively performing a guided topological sort on a directed acyclic graph that includes elements of the ordered input set and the first cluster, integrating an input total order at each iteration; and performing software analysis using the merged set.

2. The method of claim 1, wherein determining the similarity score includes determining a distance value d based on a longest common subsequence between the ordered input set L and the at least one ordered cluster set R.

3. The method of claim 2, wherein determining the similarity score includes determining the distance value as:

$$d = |L \cup R| - |lcs(L,R)|$$

where $lcs(\cdot,\cdot)$ is a longest common subsequence between input totally ordered sets.

4. The method of claim 3, wherein determining the similarity score includes calculating the similarity score as:

$$\frac{|L| + |R| - d}{|L| + |R|}.$$

5. The method of claim 1, wherein the guided topological sort preserves input orders.

6. The method of claim 1, wherein the ordered input set and the at least one ordered cluster set include call profiles.

7. The method of claim 6, wherein performing software analysis includes identifying common input/output operations in the merged set and optimizing a software program to improve the performance of the common input/output operations.

8. The method of claim 7, wherein optimizing the software program comprising allocating additional computing resources to the common input/output operations.

9. A computer program product for software analysis, the computer program product comprising a computer readable storage medium having program instructions embodied therewith, the program instructions executable by a hardware processor to cause the hardware processor to:

determine a similarity score for an ordered input set and at least one ordered cluster set that represents a distance between the ordered input set and the at least one ordered cluster set;

determine that the ordered input set is similar to a first cluster of the at least one ordered cluster set, based on the similarity score;

merge the ordered input set to the first cluster of the at least one cluster set to generate a merged set that preserves an ordering of the ordered input set and the first cluster by generating an edit script to merge the ordered input set and the first cluster and iteratively performing a guided topological sort on a directed acyclic graph that includes elements of the ordered input set and the first cluster, integrating an input total order at each iteration; and perform software analysis using the merged set.

10. The computer program product of claim 9, wherein the program instructions further cause the hardware processor to determine a distance value d based on a longest common subsequence between the ordered input set L and the at least one ordered cluster set R.

11. The computer program product of claim 10, wherein the program instructions further cause the hardware processor to determine the distance value as:

$$d = |L \cup R| - |lcs(L,R)|$$

where $lcs(\cdot,\cdot)$ is a longest common subsequence between input totally ordered sets.

12. The computer program product of claim 11, wherein the program instructions further cause the hardware processor to calculate the similarity score as:

$$\frac{|L| + |R| - d}{|L| + |R|}.$$

13. The computer program product of claim 9, wherein the guided topological sort preserves input orders.

14. The computer program product of claim 9, wherein the ordered input set and the at least one ordered cluster set include call profiles.

15. The computer program product of claim 14, wherein the program instructions further cause the hardware processor to identify common input/output operations in the merged set and to optimize a software program to improve the performance of the common input/output operations.

16. A software analysis system, comprising:

a hardware processor;

a memory that stores a computer program which, when executed by the hardware processor, causes the hardware processor to:

determine a similarity score for an ordered input set and at least one ordered cluster set that represents a distance between the ordered input set and the at least one ordered cluster set;

determine that the ordered input set is similar to a first cluster of the at least one ordered cluster set, based on the similarity score;

merge the ordered input set to the first cluster of the at least one cluster set to generate a merged set that preserves an ordering of the ordered input set and the first cluster by generating an edit script to merge the ordered input set and the first cluster and iteratively performing a guided topological sort on a directed acyclic graph that includes elements of the ordered input set and the first cluster, integrating an input total order at each iteration; and perform software analysis using the merged set.

* * * * *